3,023,473
FASTENING DEVICE
Clarence W. Cochran, Belmont, Mass., assignor to United-Carr Fastener Corporation, Boston, Mass., a corporation of Delaware
Filed Nov. 26, 1958, Ser. No. 776,472
2 Claims. (Cl. 24—243)

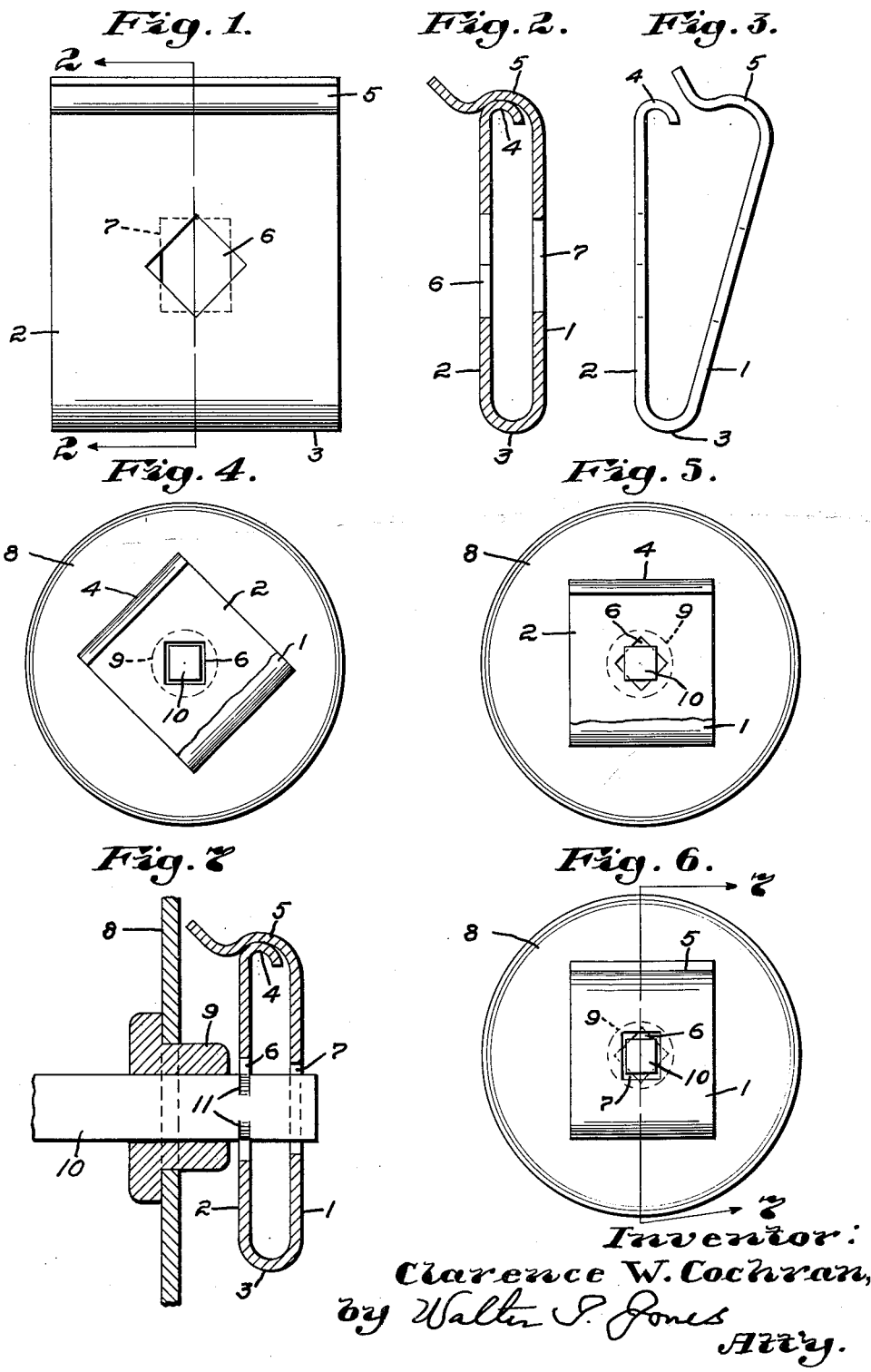

My invention aims to provide a fastening clip that is simple, inexpensive, easy to operate and usable in many assemblies where parts are to be held together and a shaft or stud is used as a part of the assembly.

An object of my invention is to provide a fastening clip that may be easily installed in and removed from an assembly and may engage a stud or shaft in locked engagement therewith at positions along the shaft without providing a pre-arranged notch or groove.

Referring now to the drawings:

FIG. 1 is an enlarged front view of one form of my improved fastening clip;

FIG. 2 is a section taken on the line 2—2 of FIG. 1;

FIG. 3 is an edge view of the clip shown in FIG. 1 in unattached position;

FIG. 4 is a front view of an assembly showing my invention with the outer platelike portion broken away and before rotation of the clip to locked position;

FIG. 5 is a view of the parts shown in FIG. 4 with the clip rotated into locked position on a shaft;

FIG. 6 is a front elevation of the complete assembly with the parts in locked relation; and FIG. 7 is a section taken on the line 7—7 of FIG. 6.

The particular embodiment of my invention, as illustrated by the drawings, shows a fastening clip formed from a single piece of metal. It has a body portion provided with two superposed platelike portions 1 and 2 connected by a portion 3 at adjacent ends as illustrated in FIG. 3. The other ends of the plate-like portions are provided with finger operable fastener elements 4 and 5.

The platelike portion 2 has a shaft receiving aperture 6 and the platelike portion 1 has a shaft receiving portion 7 axially aligned with the aperture 6. Each of these apertures is non-circular in shape and I have found, that making one rectangular and one square in shape and with one rotated 90 degrees relative to the other, that the most efficient construction is provided.

My improved clip may be used in various assemblies and, therefore, I have shown in FIGS. 4, 5, 6 and 7 only enough parts of an assembly to illustrate one use. In FIG. 7 I have shown a disc 8, a bearing 9 and a square shaft 10. The cross-sectional assembly of the fastening clip is shown in FIGS. 4 and 5. In FIG. 4 the clip is shown as it is first slipped over the end of the shaft 10 entering the aperture 6 in the platelike portion 2 and with the clip in the open position as shown in FIG. 3. Then the clip is rotated relative to the shaft 45 degrees until it reaches a position as shown in FIG. 5. Since the wall surrounding the aperture 6 is square and the aperture 6 is only slightly larger than the cross sectional area of the square shaft 10, the wall will act as a cutting means and cut a groove 11 into the four corners of the shaft 10 as shown in FIGS. 5 and 7. Then in order to lock the shaft and clip, the platelike portion 1 is pressed toward the platelike portion 2 and the end of the shaft 10 enters the rectangular aperture 7 as shown in FIG. 7. Thereafter the platelike portion 1 is pressed toward the platelike portion 2 until the snap operable fastener elements 4 and 5 are interengaged as shown in FIG. 7. Any accidental relative rotation between the shaft 10 and the fastening clip will be prevented because the wall surrounding the aperture 7 would engage with the flat sides of the shaft before the clip could be rotated from the position shown in FIG. 5 to the position shown in FIG. 4. Whenever it is desired to remove the clip it is only necessary to pull the fastener portion 5 away from the fastener portion 4 and then rotate the parts to the position shown in FIG. 4.

It will readily be seen that although the shaft 10 is free to move axially within the bearing 9, the biting action of the walls surrounding the aperture 6 and the subsequent locking of the platelike portion 1 with plate 2 will prevent any further axial movement of the shaft toward the bearing so that the presence of the clip acts as a keeper on the shaft.

While I have illustrated and described a preferred embodiment of my invention, the invention is best defined by the following claims.

I claim:

1. A shaft keeper means of the class described comprising spaced plate portions connected by a bight, said plate portions being provided with axially aligned non-circular apertures and said apertures being 90° out of phase, the walls adjacent the first of said apertures adapted for cutting engagement with shaft means inserted therein upon relative rotation therewith and snap engagement means on the free end of said plate portions adapted for cooperation to retain said plate portions in spaced parallel relation.

2. A shaft keeper assembly comprising hinged spaced plate portions having non-circular apertures therein, the first of said plate portions adapted for axial insertion over a shaft with the walls of the aperture adapted for cutting engagement therewith upon relative rotaion, the second of said plate portions having the aperture out of phase with said first aperture so as to be aligned with said shaft after rotation and snap fastening means on the distal end of said plates to retain said plates in proximate relation after assembly.

References Cited in the file of this patent

UNITED STATES PATENTS

| 1,717,671 | Fillya | June 18, 1929 |
| 2,280,304 | Schauer | Apr. 21, 1942 |
| 2,593,064 | Silberman | Apr. 15, 1952 |
| 2,896,985 | Braatz | July 28, 1959 |
| 2,923,385 | Tinnerman | Feb. 2, 1960 |

FOREIGN PATENTS

| 686,971 | Great Britain | Feb. 4, 1953 |